July 13, 1965  K. M. ALLEN ETAL  3,194,390
FLUID PRESSURE CONTROLLED VIBRATING CONVEYOR
Filed Oct. 29, 1962  2 Sheets-Sheet 1

INVENTORS.
KENNETH M. ALLEN
CHESTER H. HARPER
BY
BUCKHORN, BLORE, KLARQUIST & SPARKMAN
ATTORNEYS

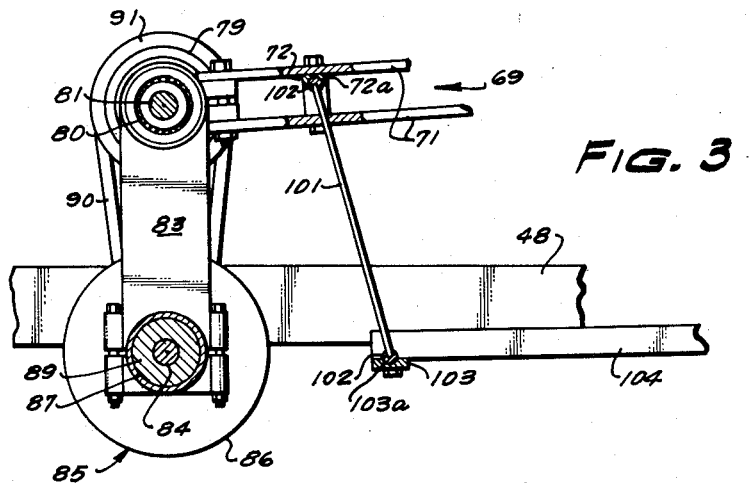

3,194,390
FLUID PRESSURE CONTROLLED VIBRATING
CONVEYOR
Kenneth M. Allen and Chester H. Harper, Newberg,
Oreg., assignors to Allen-Harper, Inc., Newberg, Oreg.,
a corporation of Oregon
Filed Oct. 29, 1962, Ser. No. 233,702
14 Claims. (Cl. 198—220)

This invention relates to a vibrating conveyor, and has for an object thereof the provision of a new and improved vibrating conveyor.

Another object of the invention is to provide a vibrating conveyor having improved isolation of its vibrating elements from the supporting structure.

Another object of the invention is to provide a vibrating conveyor in which the rate of speed of material thereby may be simply and effectively controlled and stopped when desired.

Another object of the invention is to provide an improved vibrator mounting in a vibrating conveyor.

A further object of the invention is to provide improved structure for a trough of a vibrating conveyor.

In a vibrating conveyor illustrating certain features of the invention there may be provided a floating conveyor trough vibrated through a connecting rod by an eccentric rotor driven by a motor pivotally supported on the connecting rod. There also may be provided a pneumatic thrust member connected at one end to the trough and at the other end to a supporting structure for the trough, together with resilient means tending to pull the trough against the action of the pneumatic means.

A complete understanding of the invention may be obtained from the following detailed description of a vibrating conveyor forming a specific embodiment thereof, when read in conjunction with the appended drawings, in which:

FIG. 3 is an enlarged, fragmentary vertical section of a portion of the conveyor of FIG. 1;

FIG. 4 is a longitudinal vertical section of the conveyor of FIG. 1;

FIG. 5 is a longitudinal vertical section of the conveyor of FIG. 1; and

Figure 1:
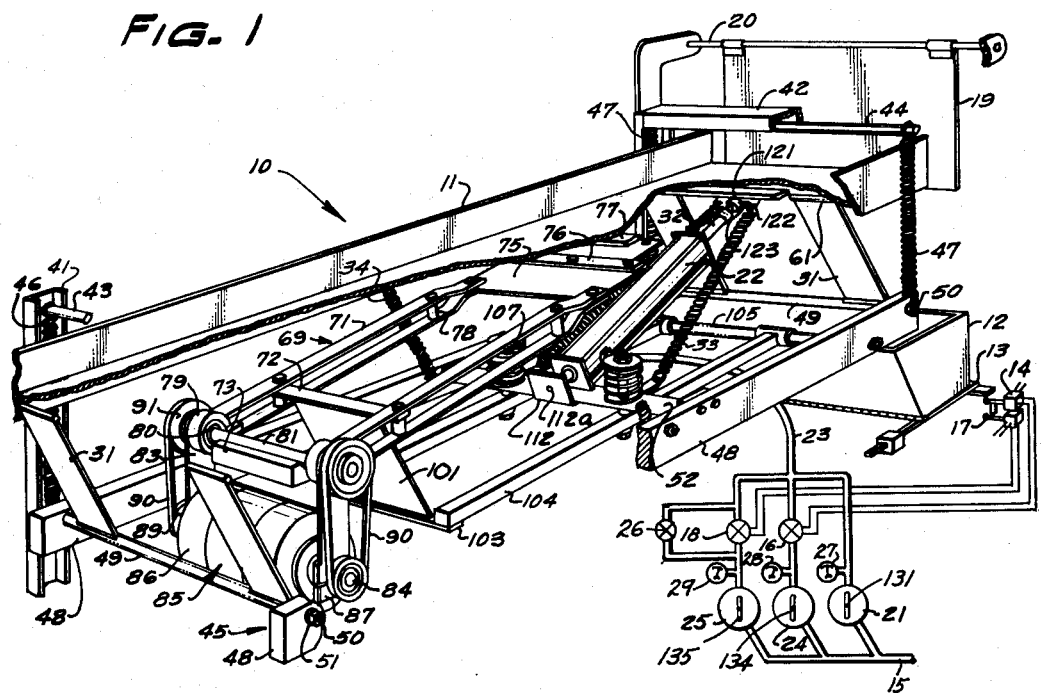
FIG. 1 is a partially schematic, partially sectional, perspective view of a vibrating conveyor forming one embodiment of the invention.

Referring now in detail to the drawings, there is shown therein a vibrating conveyor 10 for feeding discrete or particulate material such as, for example, potato chips, fruit or the like along a trough 11 into a hopper 12 of a weighing scale 13 from a source of the particulate material (not shown) positioned above the left hand end of the trough 11, as viewed in FIG. 1. As will be brought out in greater detail hereinbelow, the conveyor 10 is driven at one high rate of speed to feed the material into the hopper 12 until the weight on the scale 13 approaches the desired weight. At that time the scale 13 will actuate a limit switch 14 to open control valve 16 from a supply line 15 of air under a predetermined high pressure to cause the conveyor 10 to slow the rate of feed to a dribble, then when the desired weight of material on the scale 13 reaches the scale, the scale actuates another limit switch 17 which opens a valve 18 to cause the conveyor 10 or stop its feed by moving the trough 11 to a position in which it has no component of feed, that is, a dead center position, in which position the right hand end or discharge end of the trough 11 is abutting a closing flap 19 pivotally mounted on a rod 20, the flap 19 merely being positioned by gravity against the end of the trough 11 to prevent accidental spillage of the material from the trough 11. During normal feed an adjustable pressure regulator 21 reduces the pressure of the air from the supply line 15 to a second predetermined pressure and supplies this air to the lower end of a pneumatic positioning cylinder 22 of the conveyor 10. Then when the valve 16 is opened, air under a third predetermined pressure slightly higher than the second predetermined pressure is supplied through conduit 23 to the lower end of the cylinder 22 from an adjustable pressure regulator 24. Similarly, when the full measure or weight desired is in the hopper, the scale actuates the switch 17 to open the valve 18 to supply air from an adjustable pressure regulator 25 under an even higher pressure than that of the air from the regulator 24 to the cylinder 22 and stop further feed of the material. A manually operable valve 26 bypassing valve 16 may be opened whenever it is desired to stop the feed, but during operation of the conveyor normally is closed. Pressure gauges 27, 28 and 29 are provided to aid in adjusting the regulators 21, 24 and 25.

The trough 11, when feeding at the high or normal rate of feed, is positioned at a substantial distance from the flap or closure member 19, the trough 11 being mounted on struts or pivot links 31 forming parts of a parallelogram linkage supporting the trough 11. When the higher pressure air from the supply 24 is supplied to the lower end of the cylinder 22 it urges the trough 11 through a piston connecting rod 32 to a position in which the struts 31 are normally in a more vertical position so that the component of feed of the trough 11 by vibration thereof is substantially lessened. When the air from the highest pressure supply 25 is supplied to the cylinder 22, the piston rod 32 is urged to such a position that the struts 31 are substantially vertical to completely stop the feeding component of the trough 11. The piston 32 acts against springs 33 which generally parallel the cylinder 22 and piston 32. Springs 34 are provided which urge the trough 11 toward a bed plate or floating support member 45 slightly to keep the struts seated in their supports.

Figures 2, 6:
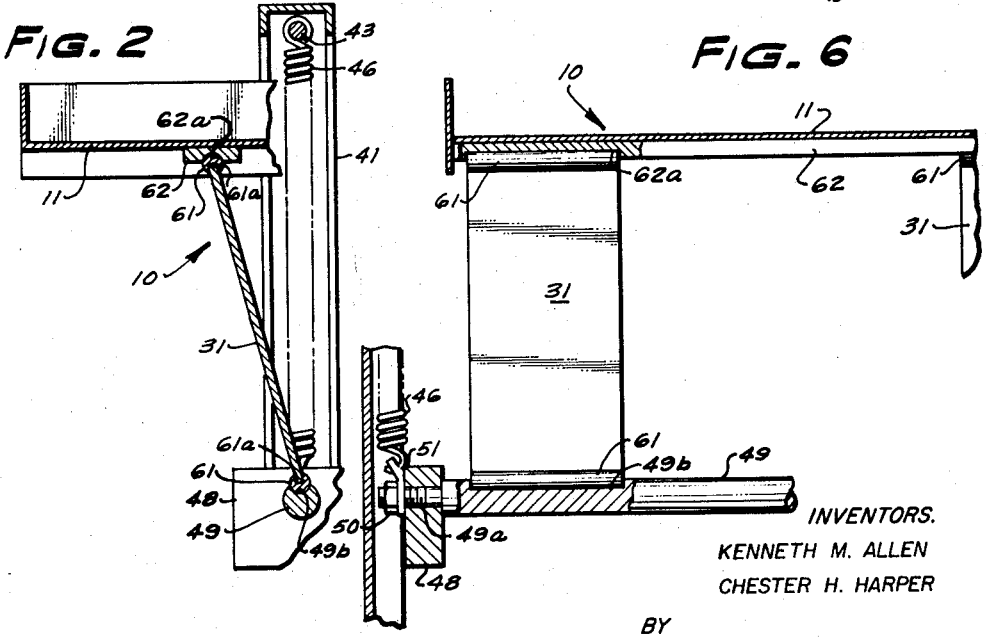
FIG. 2 is an enlarged, fragmentary, longitudinal vertical section of a portion of the conveyor of FIG. 1.
FIG. 6 is an enlarged, transverse vertical section of the conveyor of FIG. 1.

The conveyor 10 includes a fixed frame or support comprising arched channel members 41 and 42 secured to the floor which carry rods 43 and 44 from which the bed plate or floating support member 45 is suspended by pairs of springs 46 and 47 which extend along the interior of the channel members between the flanges thereof. The bed plate 45 includes longitudinal bars or joists 48 to which are secured crossrods 49 having threaded ends 49a on which nuts 50 are threaded to secure anchor washers 51 (FIG. 6). The rods 49 are rigid and are rigidly fixed to the joists 48. A crossplate 52 (FIG. 1) is rigidly secured at its ends to the joists 48. As illustrated in FIGS. 2 and 6, the struts 31 are journaled to the trough 11 and the rods 49 by short, cylindrical or rod-like pieces 61 of a low-friction material such as nylon which fit in complementary, arcuate bearing recesses 62a and 49b formed respectively in a cross support or bar 62 fixed to the bottom of the conveyor trough 11 and in the rods 49. The ends of the struts fit in slots 61a in the pieces 61, and are preferably secured thereto by an adhesive and/or pins.

To vibrate the conveyor trough 11, pairs of rigid straps 71 and a crossbrace 72 form a connecting rod 69 connecting to the conveyor trough 11 a driven shaft 81 and eccentrically mounted weight 73, which form together an eccentric rotor. The pairs of straps 71 are connected to a flexible web 75 of fiberglass reinforced plastic material such as, for example, a known polyester compound, which is fastened to the conveyor trough 11. The straps 71 transmit thrust therealong to the conveyor trough. The upper or right hand end of the web 75, as viewed in FIG. 1, is connected to plates 76 fixed to a bar 77 rigidly connected to the bottom of the conveyor trough 11. The straps 71 are spaced apart throughout most of their length by spacer pins 78 and are connected at their left hand ends, as viewed in FIGS. 1 and 3, to outer bearings 79 rotatably supporting trunnions (not shown) of hanger straps 83 which support bearings 80 rotatably supporting the shaft 81. The hanger straps 83 carry at their lower ends bearings 87 for a shaft 84 of a motor 85, and the straps are secured rigidly to the outer housing or stator 86 of the motor 85. The shaft 84 of the motor 85 carries pulleys 89 driving belts 90 to drive pulleys 91 keyed to the shaft 81. In this way the motor 85 is fully supported by the connecting rod 69 of the vibrator.

The weight of the connecting rod 69 and the motor 85 and vibrator is supported primarily by a strut 101 (FIG. 3) having low friction nylon ends 102 mounted in arcuate bearing recesses 72a and 103a formed in the crossbar 72 and a crossbar 103 (FIG. 5) fixed to arms 104 pivotally mounted on a rod 105 rigidly secured to the joists 48. The arms 104 are rigidly connected at their outer ends by the crossbar 103 and are supported by rods 107 urged upwardly by compression springs 108 bearing against the plate 52 and spring seats 110 to resiliently support the connecting rod and the eccentric rotor and motor elements supported by the connecting rod from the bed plate 45. The rods 107 support the arms 104 for limited pivotal movement through resilient washer-like members 111.

The lower end of the cylinder 22 is supported on a plate or bracket 112 rigid with the plate 52 and carried by the plate or bar 52. The plate 112 has a ball socket 112a therein which acts as a ball and socket joint with a ball member 115 formed on the end of the cylinder 22. Similarly the piston rod 32 has a ball member 121 fitting into a socket portion 122 in a bracket 123 fixed to crossbar 62. The springs 33 are secured at their upper ends to the right hand crossbar 62 (FIG. 5) and at their lower ends to tie plates 124 fixed rigidly to the crossbar 52.

In the operation of the vibrating conveyor described above, the connecting rod 69 (FIG. 1) transmits a vibrating motion from the vibrating, eccentrically weighted shaft 81 primarily longitudinally to the trough 11 to oscillate the trough 11 on its pantograph supporting links 31 to feed the material, the pneumatic cylinder 22 and the tension springs 33 tending to hold the trough in a predetermined normal position but providing a cushioned balance permitting easy vibration of the conveyor trough 11 along its length. Both the springs 33 and the cylinder 22 and piston 32 extend diagonally but primarily longitudinally relative to the conveyor trough 11. The strut 101 supporting the connecting rod 69 together with the motor 85 and eccentric elements of the vibratory drive permits low friction, free longitudinal vibration of the connecting rod, and these vibratory elements are resiliently supported by framework formed by the arms 104. The connecting rod 71 extends almost parallel to the trough 11 so that longitudinal vibrating forces transmitted through the connecting rod 71 are transmitted substantially undiminished to longitudinal vibration of the trough. The heavy motor 85 hangs substantially at right angles to the connecting rod and on relatively long pivot arms or straps 83 so that it has a negligible effect on the longitudinal vibration of the connecting rod. However, since the inertia of the motor 85 is high relative to that of the eccentrically mounted weight 73 and is connected transversely to the connecting rod, the transverse or vertical vibration of the connecting rod 71 in FIG. 3 is of a very low amplitude. As a result, very low amplitude of vibration is transmitted to the spring 108 and the bed plate 45. This support of the motor 85 and the vibrator drive elements is such that substantially no vibration from the trough 11 and connecting rod 71 is transmitted to the floating frame or bed plate 45 which could be, if desired, mounted in a fixed position.

During vibration of the trough 11, the air in the cylinder 22 under selected pressure acts as a spring or resilient means balanced against the springs 33, and the piston to which the piston rod 32 is attached moves in the cylinder against the resilient action of the air. The pressure of the air in the cylinder sets the center of vibration of the conveyor trough, and to change the feed rate, it is merely necessary to change the air pressure supplied to the cylinder, the lower the pressure the faster the rate of feed of the material. This is done automatically in steps as described above by the valves 16 and 18 actuated by the switches 14 and 17, respectively. The air pressures also may be adjusted in very small increments by manually adjusting the regulators 21, 24 and 25, which have adjusting handles 131, 134 and 135, respectively.

It is to be understood that the above-described arrangements are simply illustrative of the application of the principles of the invention. Numerous other arrangements may be readily devised by those skilled in the art which will embody the principles of the invention and fall within the spirit and scope thereof.

We claim:
1. In a vibrating conveyor, a floating conveyor trough,
 a connecting rod connected to the trough in a generally horizontally extending position,
 an eccentric rotor,
 means mounting the rotor rotatably on the connecting rod,
 a motor,
 means pivotally suspending the motor from the connecting rod in a position in which the motor is spaced vertically from the rotor,
 and means connecting the motor drivingly to the rotor.
2. In a vibrating conveyor, a conveyor trough,
 means mounting the conveyor for oscillation,
 a connecting rod connected at one end thereof to the trough in a position extending generally horizontally,
 an unbalanced rotor journaled on the other end of the connecting rod,
 a motor,
 hanger means pivotally connected to the connecting rod and suspending the motor from the connecting rod,
 and means drivingly connecting the motor to the rotor.
3. In a vibrating conveyor,
 support means,
 a trough,
 parallelogram linkage means mounting the trough on the support means,
 resilient pneumatic means extending diagonally between the trough and the support means to urge the trough toward a predetermined normal position relative to the support means and serving to prevent collapse of the parallelogram linkage,
 and means for vibrating the trough.
4. In a vibrating conveyor, a floating conveyor trough,
 a connecting rod connected to the trough,
 an eccentric rotor,
 means mounting the rotor rotatably on the connecting rod,
 a motor,
 means pivotally supporting the motor on the connecting rod,
 means connecting the motor drivingly to the rotor,
 a resiliently mounted bed plate,
 and resilient means supporting the connecting rod, the rotor, the mounting means, the motor, the supporting means and the connecting means from the bed plate.
5. The vibrating conveyor of claim 3 and including
 means for adjusting the resilient pneumatic means to shift normal position of the trough means from said predetermined normal position.
6. In a vibrating conveyor, a conveyor trough,
 support means,
 parallelogram linkage means supporting the trough on the support means for free pivotal movement therebetween,
spring means biasing the trough in one direction,
and pneumatic cushion means connecting the trough and the support means and biasing the trough in a direction opposite to said one direction to a predetermined position relative to the support means.

7. In a vibrating conveyor, a trough having an open end,
means for vibrating the trough to feed articles therealong toward the open end and discharge from the open end,
a closure member spaced from the open end during feed of the articles,
shifting means for shifting the trough from a feeding position to the closure member to stop discharge of the material from the open end of the trough,
and positioning means for so positioning the trough as the trough is shifted to stop feed of material along the trough.

8. In a vibrating conveyor, a trough having an open end,
a support,
parallelogram linkage means on the support and normally supporting the trough in a first position in which the trough is a predetermined distance from dead center and movable to support the trough in a second position closer to dead center and a third position at dead center,
means for vibrating the trough to feed articles therealong the open end and discharge from the open end,
shifting means for shifting the trough from the first position to the second position and from the second position to the third position,
weighing means for receiving material discharged from the trough,
means actuated by the weighing means for actuating the shifting means to shift the trough from the first position to the second position when the weighing means has received a predetermined weight of material,
and means actuated by the weighing means for actuating the shifting means to shift the trough from the second position to the third position when a second predetermined weight of material has been received by the weighing means.

9. In a vibrating conveyor,
support means,
a trough for feeding material,
parallelogram linkage means mounting the trough on the support means,
a vibrator means,
a motor for driving the vibrator means,
connecting rod means extending along the trough and connected at one end to the trough and supporting at the other end the vibrator means and the motor,
and resilient linkage means partially supporting the connecting rod means from the support means.

10. In a vibrating conveyor, a conveyor trough,
support means,
parallelogram linkage means supporting the trough on the support means for pivotal movement therebetween,
means for vibrating the trough,
spring means biasing the trough in one direction,
a piston connected pivotally to the trough,
a pneumatic cylinder enclosing the piston and connected pivotally to the support means,
and means for supplying air under pressure to the cylinder to urge the piston in a direction acting against the spring means to bias the trough to a predetermined position relative to the support means in which the trough means feeds material at a given rate of speed.

11. The vibrating conveyor of claim 10 wherein there is provided means for controlling the air supplying means to shift the trough to a second position in which the trough does not feed the material.

12. The vibrating conveyor of claim 10 wherein there is provided means for controlling the air suppling means to shift the trough to a second position in which the trough feeds the material at a different rate of speed.

13. The vibrating conveyor of claim 9 wherein the resilient linkage means includes
arm means pivotally connected at one end to the support means,
spring means acting between the arm means and the support means to urge the arm means to a position extending generally parallel to the connecting rod means,
and link means pivotally connected to the connecting rod means near the vibrator means and to the arm means.

14. In a vibrating conveyor,
fixed support means,
material-feeding means mounted movably on the fixed support means,
means for vibrating the material-feeding means,
means supporting the material-feeding means movably on fixed support means,
resilient means normally urging the material-feeding means to a predetermined position relative to the support means,
and pneumatic means connected between the fixed support means and the material-feeding means for shifting the material-feeding means to a position different from said predetermined position.

References Cited by the Examiner

UNITED STATES PATENTS

| | | |
|---|---|---|
| 1,810,882 | 6/31 | Heymann. |
| 2,563,081 | 8/51 | Tanner. |
| 2,850,184 | 9/58 | Musschoot. |
| 2,899,044 | 8/59 | Allen |
| 3,019,889 | 2/62 | Carrier. |

FOREIGN PATENTS 1,047,708   12/58   Germany.

SAMUEL F. COLEMAN, *Primary Examiner.*

EDWARD A. SROKA, *Examiner.*